United States Patent [19]
Inoue

[11] Patent Number: 5,906,247
[45] Date of Patent: May 25, 1999

[54] BALL TRANSFER MECHANISM HAVING A BRAKING MECHANISM AND A VEHICLE EMPLOYING THE BALL TRANSFER MECHANISM

[75] Inventor: Akira Inoue, Neyagawa, Japan

[73] Assignee: EXEDY Corporation, Neyagawa, Japan

[21] Appl. No.: 08/985,961

[22] Filed: Dec. 5, 1997

[30] Foreign Application Priority Data

Dec. 6, 1996 [JP] Japan .................................. 8-326979
Jan. 23, 1997 [JP] Japan .................................. 9-010544

[51] Int. Cl.⁶ .................................................. B62D 9/04
[52] U.S. Cl. ................................ 180/20; 16/35 R; 16/26; 188/1.12
[58] Field of Search ..................... 180/20, 7.1; 280/285; 16/26, 35 R, 24; 188/268, 1.12

[56] References Cited

U.S. PATENT DOCUMENTS

| | | | |
|---|---|---|---|
| 3,557,401 | 1/1971 | Castors | 16/26 |
| 3,577,620 | 5/1971 | Hoffman | 16/26 |
| 3,739,894 | 6/1973 | Hinman | 16/26 |
| 3,744,083 | 7/1973 | Jenkins | 16/24 |
| 4,696,583 | 9/1987 | Gorges | 16/26 |

*Primary Examiner*—Lanna Mai
*Assistant Examiner*—Lynda Jasmin
*Attorney, Agent, or Firm*—Shinjyu An Intellectual Property Firm

[57] ABSTRACT

A ball-transfer mechanism 1 is movable along the surface of floor 9, having a main body 2, a large ball 5, a plurality of small balls 6 and a restriction member 20. The large ball 5 is spherical and contacts the floor 9. A plurality of small balls 6 are disposed within portions of the main body 2 and support the large ball 5. Some of the small balls 6 are in rolling contact with the large ball 5, but upon rolling some of the small balls 5 move to a space defined within the main body 2 away from the large ball 5, while other small balls 6 move from the space back into contact with the large ball 5. The restriction member 20 can restrict a movement of all or a part of small balls 6 by contacting balls in the space within the main body 2 thereby restricting movement of adjacent small balls 6. The ball-transfer mechanism 1 has at least one restriction member 20, but can have a plurality of restriction members such as the restriction members.

17 Claims, 13 Drawing Sheets

BALL TRANSFER MECHANISM HAVING A BRAKING MECHANISM AND A VEHICLE EMPLOYING THE BALL TRANSFER MECHANISM

BACKGROUND OF THE INVENTION

A) Field of the Invention

The present invention relates to a ball-transfer mechanism having a brake mechanism and a vehicle employing the ball-transfer mechanism.

B) Description of the Related Art

A ball-transfer mechanism is a roller device which allows a vehicle to move in any direction relative to a generally level surface. Such a ball-transfer mechanism has a structure, for example, as shown in FIG. 9. The ball-transfer mechanism shown in FIG. 9, is designated by the reference numeral 91 and is used, for example, as one of several wheels on an industrial flat car which is movable in any direction on a generally level surface. A large ball 95 which contacts the level surface 99 is configured to roll in any direction while supported by a main body 92. The ball-transfer mechanism 91 includes the main body 92 and a supporting member 94 disposed within the main body 92. A space 92a is defined between the supporting member 94 and an inner portion of the main body 92. An upper portion of the space 92a has a generally spherical shape, with lower portions of the space 92a having an annular shape open to the portion of the main body 92 where the large ball 95 is located.

A plurality of small balls 96 are retained within the space 92a and in the space between the supporting member 94 and the large ball 95. The small balls 96 may roll around edges of the supporting member 94 such that the small balls 96 are freely disposed between the supporting member 94 and the large ball 95.

The small balls 96 follow rolling movement of the large ball 95 and must withstand forces associated with the loads acting on the large ball 95. In other words, the small balls 96 provide support for the ball-transfer mechanism 91, allowing the large ball 95 to rotate in various directions within the main body 92.

When a small ball 96 enters the space 92a, the small ball 96 no longer receives the loads or forces from the large ball 95. Within the space 92a, the primary force acting on the small balls 96 is gravity. Therefore, within the space 92a, the small balls 96 naturally tend to move downward (relative to FIG. 9) and further tend to move toward areas where the least number of other small balls 96 are located. For example, the small balls 96 can easily move to an opposite side of a center axis 91a, resulting in allowing the large ball 95 to roll inside of the main body 92.

When a ball-transfer mechanism, such as that described above, is used on a flat car or other such rolling device, a brake device needs to be added to the flat car because such ball-transfer mechanisms do not have a brake function.

Although a ball-transfer mechanism provides many benefits such as being able to move in any direction, one disadvantage is that there is no direction stably during movement and not braking function.

Another means of allowing a flat car or vehicle to roll is employment of a caster installed on, for instance, a wheel chair such as that shown in FIGS. 16 and 17. FIGS. 16 and 17 shown a schematic drawing of a conventional electromotive wheelchair. As shown in FIGS. 16 and 17, a pair of casters 191 are mounted on the underside of a wheelchair 190. One caster 191 is disposed on a left front side thereof and one caster 191 is disposed on a right front side thereof. As a result, the wheelchair 190 can go straight or back and circle by controlling only two motors 193, each motor 193 connected to corresponding rear wheels 192. The caster 191 can rotate freely about an axis 191a. Rotation about the axis 191a is indicated generally in FIG. 17 by the arrows in FIG. 17.

The wheelchair 190 described above can keep going straight on a paved flat road without any problems.

However, when it goes across an inclined road or goes on a rough road, the wheelchair 190 might not go straight because the caster 191 rotates about the axis 191a. When the caster 191 roles on an inclined surface or rough road, the caster 191 often has difficulty with continued stable rolling.

SUMMARY OF THE INVENTION

The object of the present invention is to provide a ball-transfer mechanism which can roll freely in any direction but can also restrict rolling directions.

Another object of the present invention is to improve rolling stability of moving vehicle which employs the ball-transfer mechanism.

In accordance with one aspect of the present invention, a ball-transfer mechanism includes a main body, and a spherical large ball at least partially retained in the main body. The large ball is configured for rolling engagement with a generally flat surface. A plurality of spherical small balls are disposed within a portion of the main body. At least a first portion of the small balls are disposed within the main body for rolling contact with an outer circumferential surface of the large ball. The small balls have a diameter smaller than the large ball. The ball-transfer mechanism further includes at least one restriction member. A portion of the restriction member is disposed within the main body for selective engagement with a second portion of the small balls spaced apart from the first portion of the small balls. Movement of the second portion of the small balls is restricted upon engagement with the portion of the restriction member.

Preferably, the main body is formed with a cylindrically shaped case member having a closed first end, an opposing open end and a cylindrical wall extending therebetween. A supporting member is disposed within the main body. The supporting member has first and second surfaces. The first surface has a generally convex shape. The second surface has a generally concave shape. The supporting member further has a circumferential outer surface extending between the first and second surfaces. The first surface of the supporting member is formed with an extending member which is fixed to an inner surface of the first end of the main body. The inner surface of the first end of the case member and the convex surface of the supporting member define a space therebetween. The outer circumferential surface of the supporting member an inner surface of the cylindrical wall define a second space. The concave surface and the large ball defining a third space. The first portion of the small balls are disposed in the third space and the second portion of the small balls are disposed in the first space.

Preferably, the first portion of the restriction member is disposed in the first space and a rod fixed to and extending from the first portion of the restriction member extends through an aperture formed in the first end of the main body. The rod of the restriction member is configured for movement in and out of the first space.

Alternatively, the restriction member has a generally annular dish-like shape with a concave engagement surface.

The engagement surface is formed with a plurality of projections. The engagement surface and the projections are configured to face the small balls for selective engagement therewith.

Alternatively, the restriction member has a generally annular dish-like shape with a concave engagement surface. The engagement surface is formed with a groove extending from one circumferential side to an opposing circumferential side. In response to movement toward the small balls, the engagement surface of the restriction member engages the small balls restricting movement of the balls, and the small balls proximate the groove are not restricted from movement.

Alternatively, a plurality of the restriction members are disposed in the main body. Each of the restriction members is formed with a concave surface formed on a first portion thereof and a rod fixed to and extending from the first portion. The rod extends through a corresponding aperture formed in the main body. Each of the rods of the plurality of the restriction members is configured for movement in and out of the main body such that movement of one of the rods moves a corresponding one of the concave surfaces into engagement with adjacent ones of the small balls for restricting movement of the ones of the small balls.

Preferably, the ball-transfer mechanism is used on a frame.

In one of the alternative aspects of the present invention, the restriction member of the ball-transfer mechanism is configured to selectively restrict movement of the frame in a generally forward.

In another alternative aspect of the present invention, the restriction member of the ball-transfer permits a movement of the small balls so that the frame can move in any direction.

Preferably, the ball-transfer is mounted to a front end of the frame.

Preferably, the frame supports an electromotive wheelchair, the electromotive wheelchair having means for controlling movement of the restriction member.

Alternatively, the frame is an industrial flat cart having means for controlling movement of the restriction member.

In the ball-transfer mechanism, the large ball is supported by the main body via small balls and the large ball can roll freely against the main body through movement of small balls. In other words, without a movement of small balls the large ball can not roll. Since the ball-transfer mechanism of the present invention includes a restriction member which can restrict the movement of small balls, it is possible to brake a wheelchair or a cart by restricting a movement of small balls using the restriction member. Therefore, a cart of wheelchair which uses the ball-transfer mechanism of the present invention does not need a seperate brake device because the ball-transfer mechanism has its own brake function.

As well, by having restriction members with differing configuration, it is possible to selectively determine direction of rotation of the large ball in addition to providing braking ability in the ball-transfer mechanism of the present invention.

In the ball-transfer mechanism as set herein, the restriction member restricts a movement of only those small balls it contacts. Therefore, providing several restriction members, each able to contact only a portion of the small balls provides direction control for rotation of the small balls and hence direction control for rotation of the large ball. The restriction member is placed not to stop rotation of the large ball, but to stop rotation of the large ball in a specific directions.

Since the moving direction against a level surface is limited to one generally straight direction, a cart or wheelchair can keep going in a straight direction stably across the inclined face or on a rough surface.

These and other objects, features, aspects and advantages of the present invention will become more fully apparent from the following detailed description of the present invention when taken in conjunction with the accompanying drawings where like reference numerals denote corresponding parts throughout.

DESCRIPTION OF THE PREFERRED EMBODIMENTS

First Embodiment

Figure 1:
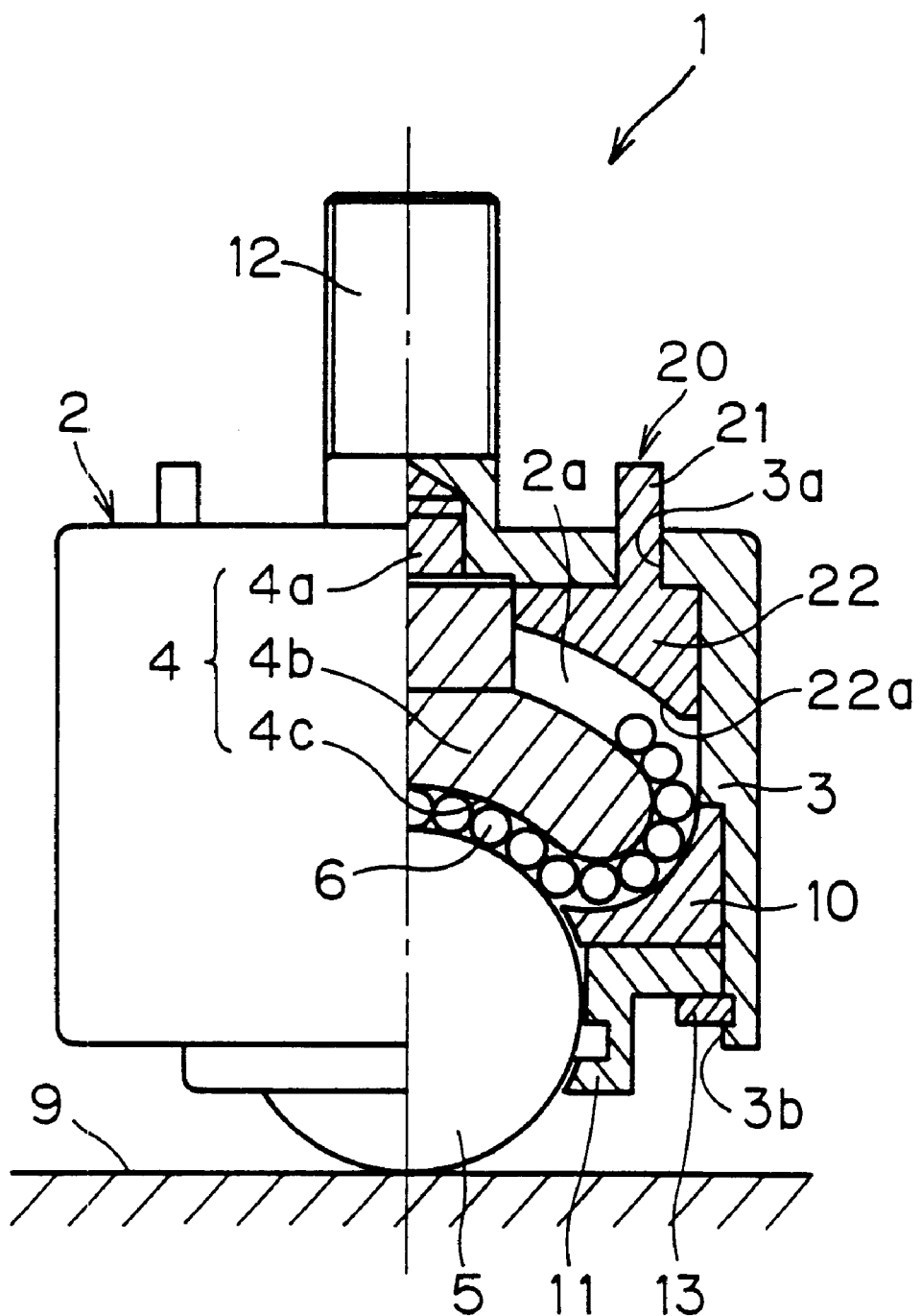
FIG. 1 is a part elevation, part cross-section side view of a ball-transfer mechanism that includes a restriction member in accordance with a first embodiment of the present invention, showing the restriction member in a disengaged position.

FIG. 1 shows a ball-transfer mechanism 1 in accordance with a first embodiment of the present invention. The ball-transfer mechanism 1 is used as, for instance, one of a plurality of wheels of an industrial flat cart which is used to carry a load of material in a factory or on the street.

The ball-transfer mechanism 1 includes mainly a main body 2, a large ball 5, a plurality of small balls 6 and a restriction member 20.

The main body 2 is formed with an installation part 12 which extends into an aperture in a flat car (not shown). The main body 2 also includes a case portion 3, a supporting member 4, a small ball retaining member 10 and a large ball retaining member 11.

The installation part 12 is formed, for instance, with thread grooves around an outer circumference thereof, by which the ball-transfer is installed in the industrial flat car (not shown).

The case portion 3 is formed integrally with the lower part of the installation part 12 and includes a plurality of rod penetrating holes 3a in upper portion thereof, as shown in FIG. 1. The case portion 3 is open at a bottom end thereof defining an opening part 3b. An internal portion of the case portion 3 is open forming a cavity. The case portion 3 has a generally cylindrical shape that is open at a bottom end.

The supporting member 4 is disposed within the internal portion of the case portion 3. The supporting member 4 includes a fixing part 4a, an abutting part 4b and a support face 4c. The supporting member 4 is fixed to the case portion 3 such that the fixing part 4a extends into a corresponding aperture formed in the case portion 3. The fixing part 4a of the supporting member 4 is rigidly attached to the case portion 3. An abutting part 4b is formed so as to be spaced apart from an inner surface of the case portion 3 such that a space 2a is defined between the case portion 3 and the abutting part 4b, as is discussed in greater detail below.

The abutting part 4b is formed with the supporting face 4c. The supporting face 4c has a generally concave, spherical-like shape and is configured to face downward, with respect to FIG. 1. The abutting part 4b has a circular outer periphery that is sized such that between an outer circumferential edge of the abutting part 4b and the inner circumferential face of the case portion 3, small balls 6 (described in greater detail below) are able to freely pass therebetween.

As mentioned above, the supporting face 4c has a generally concave, spherical-like shape. The shape of the supporting face 4c corresponds with the surface of the large ball 5. Specifically, the shape of the supporting face 4c is equidistantly spaced apart from the surface of the large ball 5 by a distance corresponding to the diameter of the small balls 6. The large ball 5 has a spherical shape and is configured to contact a floor of a factory, a sidewalk or the like. The large ball 5 is disposed in the opening part 3b and is retained within the supporting member 4 via a large ball retaining member 11. The large ball 5 contacts the small balls 6.

The small balls 6 are spheres which have a smaller diameter than the large ball 5, and are disposed between the large ball 5 and the supporting member 4. The small balls 6 are confined within the case portion 3 by a small ball retaining member 10 disposed within the opening part 3b and the large ball 5. The small balls 6 are confined to move in the space defined between the large ball 5 and the supporting member 4 and the space 2a and therebetween.

The space 2a, as described above, is defined between an upper surface of the abutting part 4b and the case portion 3. However, the space 2a is also further defined by a lower surface of the restriction member 20 which is described in greater detail below. The housing space 2a retains many small balls 6, but is usually at least partially empty because gravity draws the small balls 6 down into the space between the large ball 5 and the supporting face 4c and because contact of the small balls 6 between the large ball 5 and the supporting face 4c retains the small balls 6 therebetween when there is no rolling movement.

The restriction member 20 includes a rod 21 formed on an upper portion thereof. Preferably there are a plurality of rods 21, although only one rod 21 is shown in FIG. 1. The rod 21 contactable with a brake operating lever (not shown) which may be operated by an operator of the industrial flat cart. The restriction member 20 further includes a restriction portion 22 which is formed on a portion of the restriction member 20 disposed inside the case portion 3. The restriction portion 22 is movable in a vertical direction relative to the case portion 3 and the supporting member 4 in response to movement of the rod 21.

The rod 21 extends through a rod penetrating hole 3a formed in the case portion 3. A regulating face 22a is formed on the restricting portion 22 which can contact and engage the small balls 6. The regulating face 22a has a curved surface corresponding to the curved shape of the abutting face 4b of the supporting member 4. A friction facing is installed in the regulating face 22a, providing a generally high friction coefficient on the regulating face 22a.

When assembling the ball-transfer mechanism 1 from the above described parts, the assembling is carried out by inverting each part in FIG. 1. First, the restriction member 20 is installed in the case portion 3. Secondly, the fixing part 4a of the supporting member 4 is fixed to the case portion 3. Then, after putting a specified number of small balls 6 in the housing space 2a, the small ball supporting member 10 is installed. After the small balls 6 are put on the inverted supporting member 4, the large ball 5 is put in place. Finally, the large ball retaining member 11 is installed in the case portion 3 via an installation part 13 which may be, for example, a retaining ring.

FIG. 1 shows the ball-transfer mechanism 1 fully assembled and inverted to its operating condition. In the operating condition, the large ball 5 and small balls 6 are retained within the ball-transfer mechanism 1, because the inner diameter of the lower part of the large ball retaining member 11 is smaller than the diameter of the large ball 5. The ball-transfer mechanism 1 is configured such that a predetermined gap is defined between the large ball 5 and each of the large ball retaining member 11 and the small ball retaining member 10, when the large ball is in contact with a generally level surface, such as the floor 9 shown in FIG. 1.

In other words, when the ball-transfer mechanism 1 is in contact with a floor 9, the large ball 5 is supported by the supporting member 4 via small balls 6 not only in a vertical direction but also in directions generally parallel to the surface of the floor 9.

The operation of the present invention is described below.

When moving an industrial flat cart which uses a plurality of ball-transfer mechanism, for example, four ball-transfers mechanisms as wheels, the flat cart rolls freely when the restriction member 20 is located in a disengaged position, as shown in FIG. 1. In this state, the ball-transfers mechanisms 1 allow the large balls 5 to freely rotate. Further, the small balls 6 are movable freely within the housing space 2a and may further roll freely in response to rotation of the large ball 5. The industrial flat cart moves while the large ball 5 rolls supported by the main body 2. When the large ball 5 rolls, each small ball 6 which abuts on the upper circumferential face of the large ball 5 rolls against the supporting face 4c of the supporting member 4. At some point, small balls 6 roll from the space between the large ball 5 and the supporting member 4 and move into the space between the small ball retaining member 10 and the supporting member 4. Subsequently, the small balls 6 may move into the space 2a. Simultaneously, as some small balls 6 enter the space 2a, other small balls 6 on an opposite side of the supporting member 4 leave the space 2a and move into the space between the large ball 5 and the supporting member 4. Thus, an industrial flat cart can continue to roll smoothly since the large ball 5 can continue to easily roll within the main body 2.

The operation to restrict movement of the industrial flat cart is described below.

Figure 1A:
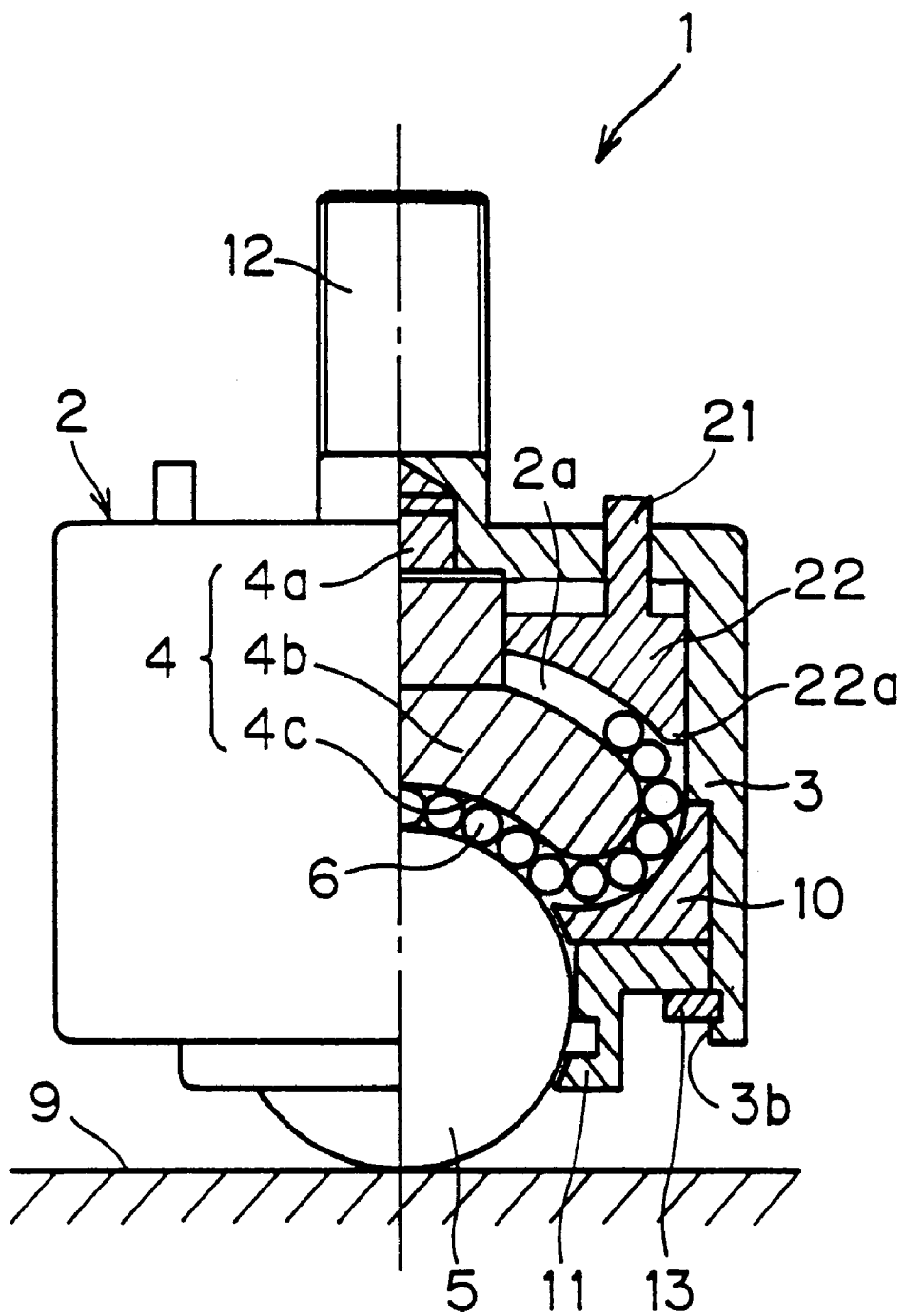
FIG. 1A is a part elevation, part cross-section side view of the ball-transfer mechanism depicted in FIG. 1 with the restriction member in an engaged position.

A brake device is included in the present invention and adds a significant advantage to ball-transfer mechanism 1. The brake device is the restriction member 20. When the restriction member 20 is in an engaged position, as shown in FIG. 1A, the ball-transfer mechanism 1 is not able to rotate in the manner described above, but rather is locked. When an operator of an industrial flat cart wishes to prevent rolling movement of the cart, a lever or other similar device (not shown) may be moved. Movement of the lever causes the rod 21 to be depressed, thus pushing the regulating face 22a toward the small balls 6. Consequently, the regulating face 22a of the restriction member 20 contacts the small balls 6, and small balls 6 are held between the upper face of the abutting part 4b and the regulating face 22a. As the result, small balls are prevented from moving within the housing space 2a. Accordingly, small balls 6 that are disposed between the supporting member 4 and the small ball retaining member 10 and between the supporting member 4 and the large ball 5 are likewise prevented from moving since there is nowhere to move to. The small balls 6 that are trapped between the upper face of the abutting part 4b and the regulating face 22a form an annular wall which prevents movement of small balls 6 to and from between the supporting member 4 and the small ball retaining member 10 and between the supporting member 4 and the large ball 5. Since non of the small balls 6 may move, the large ball 5 cannot rotate. Therefore, the friction between the large ball 5 and each the balls 6 stops rolling movement of the large ball 5, resulting in stopping the industrial flat cart. Since the friction coefficient of the regulating face 22a is large as described above, the force required to push the restriction member 20 toward the abutting part 4b of the supporting member 4 does not need to be significant. In the embodiments of the present invention, the installation of the friction facing makes the friction coefficient of the regulating face 22a large. It is also possible to increase a holding force of the regulating face 22a against small balls by making the regulating face 22a rough.

Second Embodiment

Figure 2:
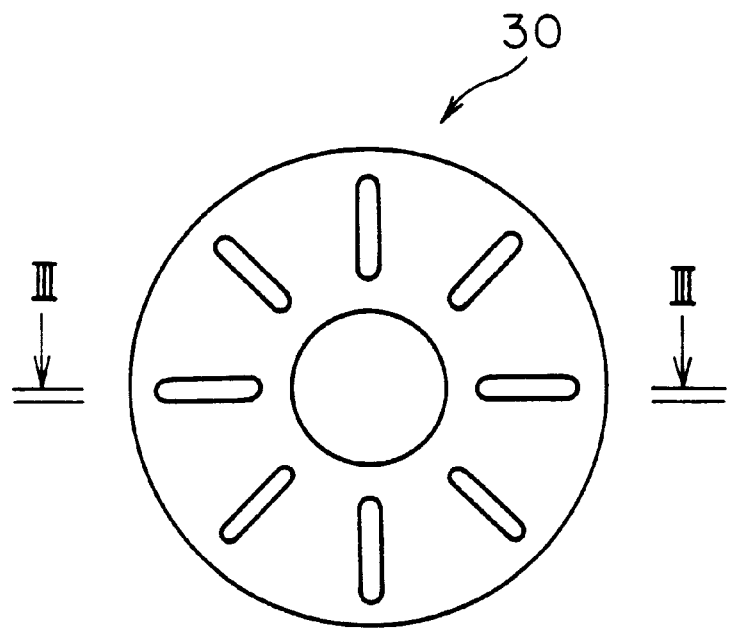
FIG. 2 is a bottom elevation view of the restriction member similar to that depicted in FIG. 1, in accordance with a second embodiment, shown removed from the ball-transfer mechanism.
Figure 3:
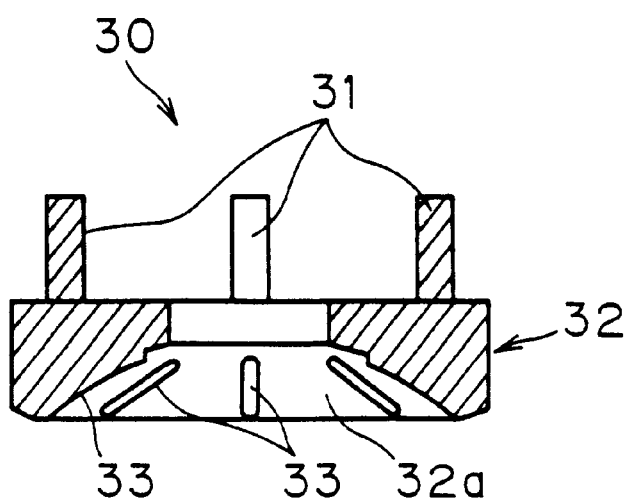
FIG. 3 is a side, cross section view of the restriction member taken along the line III—III in FIG. 2, looking in the direction of the arrows.

Instead of the restriction member 20 used in the first embodiment, a restriction member 30 shown in FIGS. 2 and 3 in accordance with a second embodiment may replace the restriction member 20.

The restriction member 30 is formed with a plurality of rods 31 which allow for contact with a brake operating lever (not shown). The rods 31 extend from a restriction portion 32 which is positioned inside the case portion 3 and is movable in a vertical directions relative to the case portion 3 and the supporting member 4. The rod 31 passes through the rod penetrating hole 3a of the case portion 3. A regulating face 32a which can abut the small balls 6 is formed on a lower surface of the restriction portion 32. The regulating face 32a is a curved face corresponding to an upper curved face of the abutting part 4b of the supporting member 4. On the regulating face 32a, there are eight ribs 33 formed which extend downward in a vertical direction.

When an operator wishes to restrict movement of the industrial flat cart, the operator operates a brake operating lever (not shown) which contacts the rod 31 of the restriction member 30 and the restriction member 30 is moved downward in a vertical direction with respect to the main body 2. Consequently, the regulating face 32a contacts the small balls 6, and small balls 6 are held between the upper face of the abutting part 4b and the regulating face 32a. As the result, small balls are prevented from moving within the housing space 2a. Accordingly, the small balls 6 between the supporting member 4 and the small ball retaining member 10 and between the supporting member 4 and the large ball 5 are also prevented from moving. Therefore, the friction caused between the large ball 5 and each small ball 6 stops a roll of the large ball 5, resulting in restricting or preventing movement of the industrial flat cart. Since the ribs 33 are formed on the regulating face 32a with predetermined gaps between the regulating face 32a and small balls 6, small balls 6 can more effectively be prevented from moving within the housing space 2a.

Therefore, the force required to move the restriction member 30 against the abutting part 4b of the supporting member 4 does not need to be very large.

Other structures and operations of the ball-transfer mechanism having the restriction member 30 are generally the same as those described above with respect to the first embodiment where the ball-transfer mechanism 1 was described.

Third Embodiment

Figure 4:
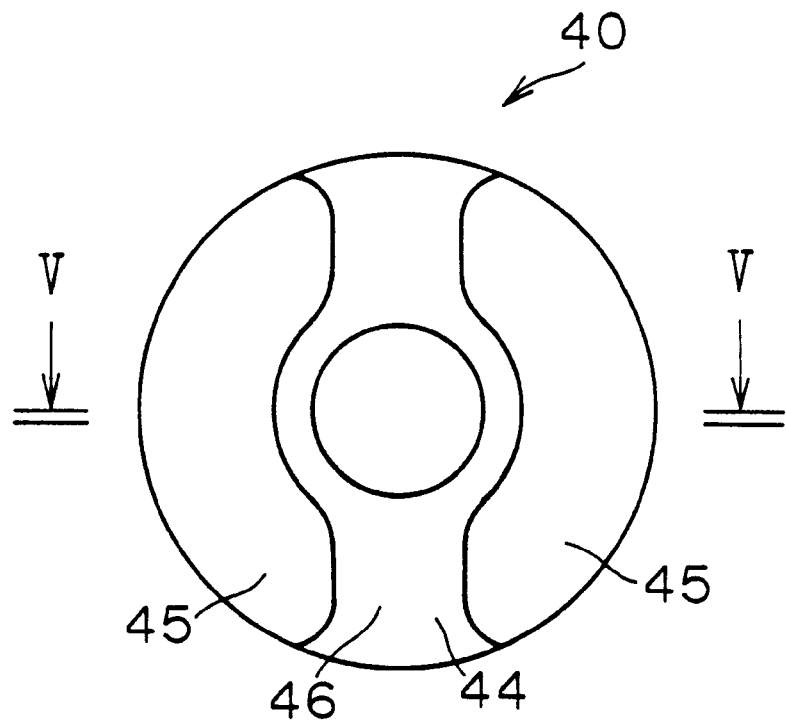
FIG. 4 is a bottom elevation view similar to FIG. 2, showing a restriction member in accordance with a third embodiment of the present invention.
Figure 5:
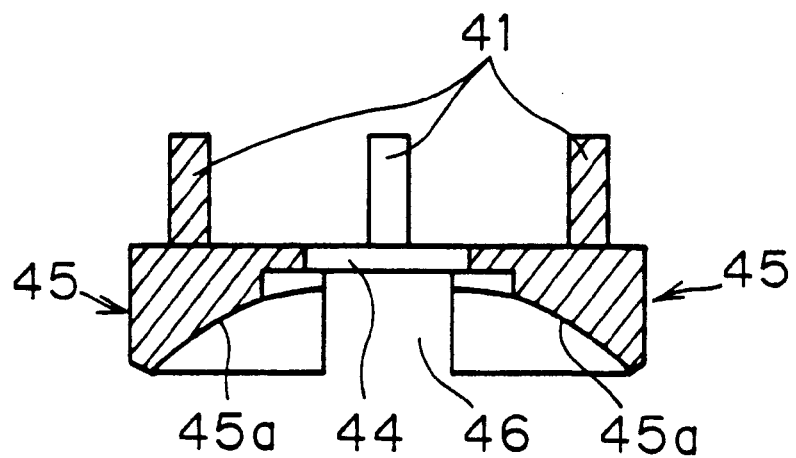
FIG. 5 is a side, cross section view of the restriction member taken along the line V—V in FIG. 4, looking in the direction of the arrows.

In accordance with a third embodiment, a restriction member 40 shown in FIGS. 4 and 5 may be employed instead of the restriction member 20 used in the first embodiment described above. In a ball-transfer mechanism having the restriction member 40, the ball-transfer mechanism can be used to limit rotation of the large ball 5 to a specific direction.

In order to avoid repetition, only features of the restriction member 40 are described in detail with respect to the third embodiment. However, it should be appreciated that, like the second embodiment above, only the restriction member 40 is new in the third embodiment compared to the first embodiment. All of the other structures and operations of the ball-transfer mechanism 1 described above with respect to the first embodiment are present in the third embodiment having the restriction member 40.

The restriction member 40 is formed with a plurality of rods 41 which may contact an operating lever. The rods 41 extend from a disk part 44 which is disposed within the case portion 3 and is movable in a vertical direction relative to the case portion 3 and the supporting member 4. The restriction member 40 is also formed with two restriction portions 45 which are formed on an underside of the disk part 44. The rods 41 extend through the rod penetrating hole 3a of the case portion 3 in a manner described previously with respect to the rods 21 of the first embodiment. The restriction portions 45 are each formed with regulating face 45a which can abut with the small balls 6. The regulating faces 45a are each formed with a curved or spherical shape corresponding to the upper curved face of the abutting part 4b of the supporting member 4. A space 46 is defined between two restriction portions 45.

When an operator wants an industrial flat cart to move in a specific direction while preventing the industrial flat cart from going in other directions, the restriction member 40 may be moved downward in a vertical direction against the main body 2 by operating an operating lever (not shown). The operating lever contacts the rods 41 of the restriction member 40, moving the restriction member 40 downward. Consequently, the partially regulating face 45a contacts adjacent small balls 6 and holds those small balls 6 between the upper face of the abutting part 4b and the partially regulating faces 45a. Accordingly, most of small balls 6 are prevented from moving within the housing space 2a, resulting in preventing movement of the small balls 6 between the supporting member 4 and the small ball retaining member 10 and between the supporting member 4 and the large ball 5. However, the small balls 6 that are disposed between the upper face of the abutting part 4b and the space 46 defined between the restriction portions 45 can move freely within the space 46. As the result, those small balls which are between the supporting member 4 and the small ball retaining member 10 and between the supporting member 4 and the large ball 5 can move in a direction generally corresponding to the length of the space 46. In other words, the large ball 5 can roll only in a direction corresponding to the length of the space 46. Therefore, an industrial flat cart can be easily set to move only in a single direction determined by the orientation of the space 46, by operating an operating lever (not shown).

Figure 5A:
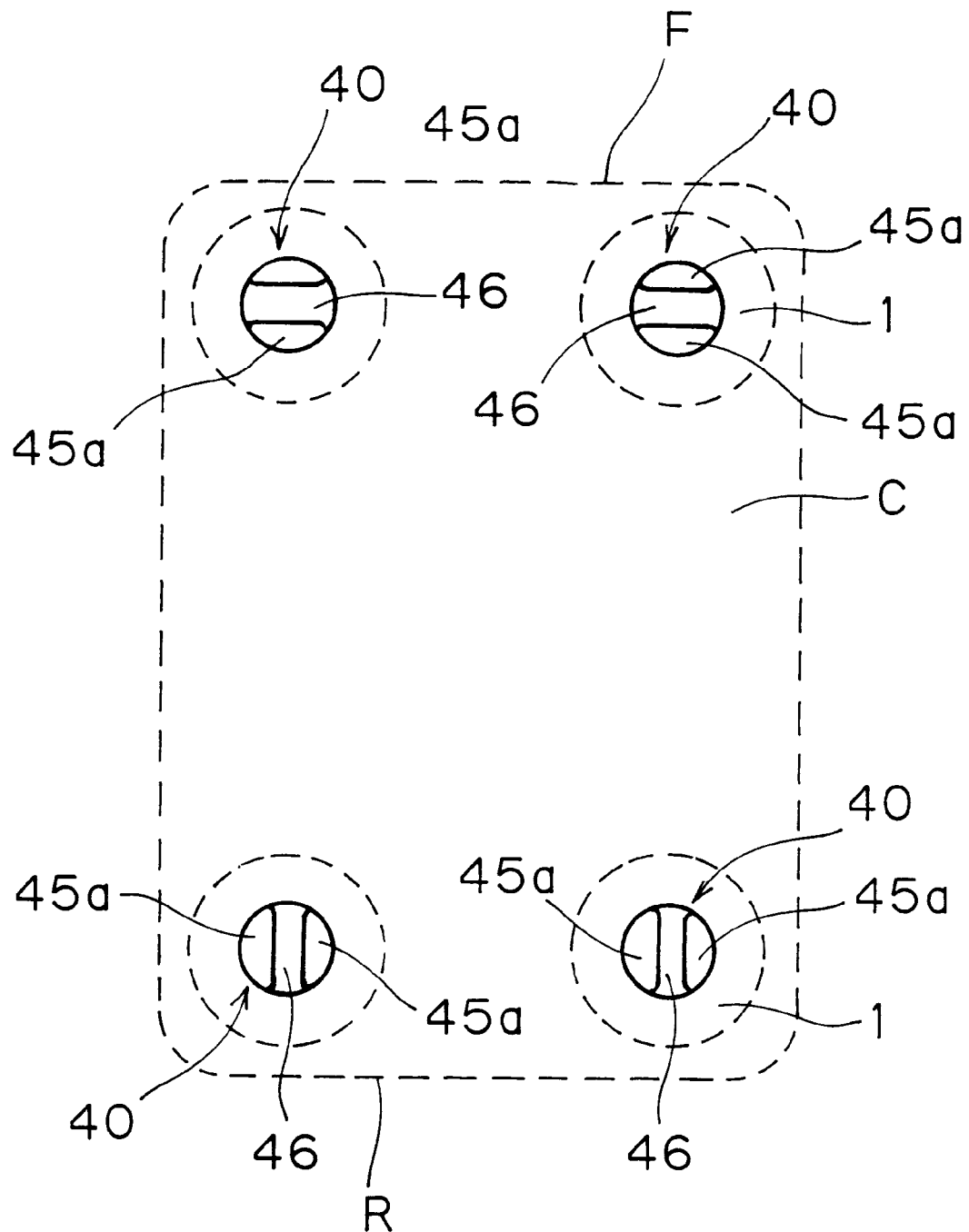
FIG. 5A is a bottom view of an industrial flat cart provided with four ball-transfer mechanisms, each ball transfer mechanism having a restriction member in accordance with the third embodiment and having a specific orientation.

With a ball-transfer mechanism 1 having the restriction member 40 it is also possible to provide braking (stopping) to the industrial flat cart. For instance, the industrial flat cart C, shown in FIG. 5A may be provided with four ball-transfer mechanisms 1, each ball-transfer mechanism 1 having a restriction member 40. However, a first pair of the ball-transfer mechanisms 1 positioned in the front F of the cart C may have the restriction members 40 oriented in a first direction with the spaces 46 oriented in alignment with each other and a second pair of the ball-transfer mechanism 1 disposed in the rear R of the cart C may have the restriction members 40 oriented in a second direction with the spaces 46 oriented parallel to each other but perpendicular to the first direction, as is shown in FIG. 5A. In this configuration, with all four ball-transfer mechanisms 1 having the restriction members 40 engaged with adjacent small balls 6, braking would be effected because the direction of rotation of the first pair of ball-transfer mechanisms 1 in the front F is in a direction perpendicular to the direction of rotation of the second pair of the ball-transfer mechanism 1 disposed in the rear R of the cart C.

It should further be appreciated that the front and rear ball-transfer mechanism 1 could have separate operating levers so that either direction or braking may be easily selected.

Alternatively, the front pair of ball-transfer mechanism 1 could be as shown in FIG. 5A and the rear pair of ball-transfer mechanism 1 could have a restriction member chosen from either the first or second embodiments.

Fourth Embodiment

Figure 6:
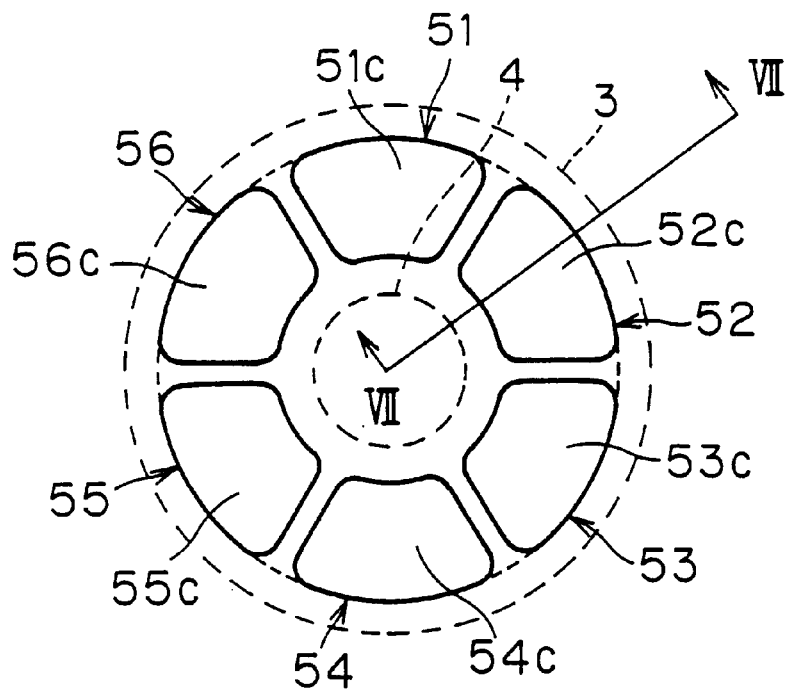
FIG. 6 is a bottom elevation view similar to FIGS. 2 and 4, showing a restriction member in accordance with a fourth embodiment of the present invention.
Figure 7:
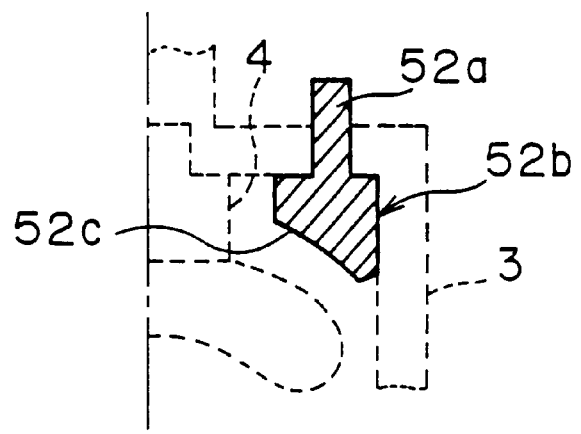
FIG. 7 is a side, cross section view of the restriction member taken along the line VII—VII in FIG. 6, looking in the direction of the arrows.

In a fourth embodiment of the present invention, the restriction member 20 used in the first embodiment may be replaced and the plurality of restriction members 51, 52, 53, 54, 55 and 56 shown in FIGS. 6 and 7 may be used. Consequently, a ball-transfer mechanism 1 may have a variety of brake and direction determining functions.

In the fourth embodiment, the restriction members 51, 52, 53, 54, 55 and 56 are each independent members, each member having generally the same shape. Therefore, description of any one of the restriction members 51, 52, 53, 54, 55 and 56 applies to all of the others. Therefore, only the restriction member 52 will be described in detail, but it should be understood that description of the restriction member 52 applies to the other restriction members 51, 53, 54, 55 and 56.

In FIG. 7, the restriction member 52 is shown. The restriction member 52 includes a rod 52a that is formed integrally with a restriction portion 52b. The rod 52a may be engaged by an operating lever (not shown). It should be appreciated that there is preferably a separate operating lever for the engaging the rod 52a and a separate operating lever for of the other restriction members 51, 53, 54, 55 and 56. The rod 52a extends through a corresponding aperture formed in the case portion 3 and is movable in a vertical direction relatively to the case portion 3 and the supporting member 4. Regulating faces are formed on each of the restriction members 51–56, however, only the regulating face 52c is shown in FIG. 7. The regulating face 52c (and the regulating faces on each of the restriction members) are curved corresponding to the upper curved face of the abutting part 4b of the supporting member 4.

Other structures of the ball-transfer mechanism 1 are generally the same as those described with respect to the first embodiment. Operations of an industrial flat cart are generally the same as in the first embodiment except that in the fourth embodiment, the ball-transfer mechanism 1 stops all movement of the industrial flat cart only when all of the restriction members 51, 52, 53, 54, 55 and 56 are moved downward.

When an industrial flat cart is to be moved in a certain direction, and it is desired to prevent the cart from going in any other direction, appropriate restriction member or members from among the restriction members 51, 52, 53, 54, 55 and 56 may be moved downward direction with respect to the main body 2 by operating corresponding ones of a plurality of operating levers (not shown). For example, when restriction members 51, 53, 54, and 56 are operated, for example, the regulating faces of restriction members 51, 53, 54, and 56 abut on adjacent small balls 6 and the engaged small balls are held between the upper face of the abutting part 4b and each of the regulating faces of the restriction members 51, 53, 54 and 56. As the result, most of the small balls 6 are prevented from moving within the housing space 2a, resulting in preventing movement of adjacent small balls 6 between the supporting member 4 and the small ball retaining member 10 and between the supporting member 4 and the large ball 5.

However, while a portion of the small balls 6 are held between the upper face of the abutting part 4b and the regulating faces of the restriction members 51, 53, 54 and 56, the remaining small balls 6 can move freely within the space formed between the upper face of the abutting part 4b and the regulating face 52c and the regulating face of the restriction member 55. Consequently, small balls 6 between the supporting member 4 and the small ball retaining member 10 and between the supporting member 4 and the large ball 5 can move in a direction corresponding to a line (not shown) drawn between the centers of restriction member 52 and the restriction member 55. Therefore, by operating a plurality of operating levers, one lever for each restriction member 51, 52, 53, 54, 55 and 56, an industrial flat cart can move in any selected direction in corresponding to two opposing pairs of the restriction members 51, 52, 53, 54, 55 and 56.

When an industrial flat cart is to be stopped, all of restriction members 51–56 are moved downward in a vertical direction with respect to the main body 2. As the result, since all small balls 6 are prevented from moving, the large ball can not move in any direction, resulting in stopping an industrial flat car completely.

In the above operation, the plurality of operating levers (not shown) may be operated manually or may be engaged by an additional control device. For instance, it is possible to connect the rods of the restriction members 51 to 56 not with operating levers but with air pressure or hydraulic cylinders which can be controlled by a solenoid. Thus, by using a regulating device it is possible to move the ball-transfer mechanism 1 in various limited directions. Although six restriction members 51 to 56 are used in this embodiment, the number of restriction members can be increased or decreased, as necessary.

Fifth Embodiment

Figure 8:
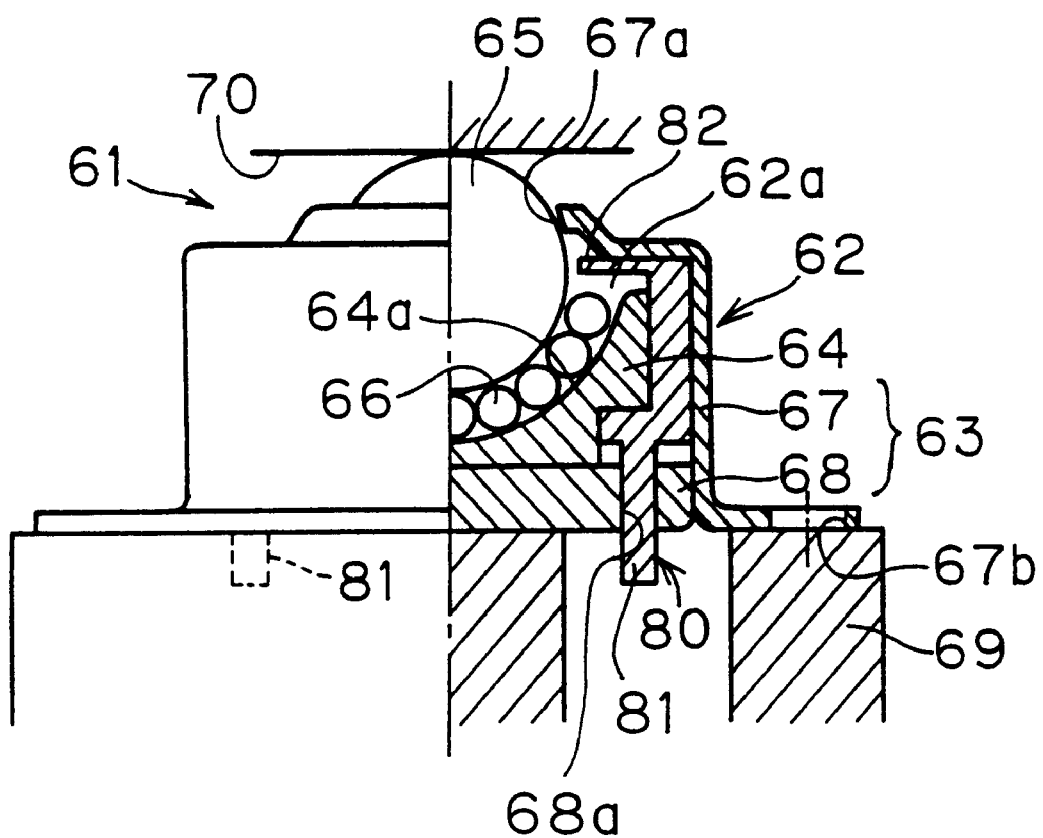
FIG. 8 is a part elevation, part cross section view showing a ball-transfer mechanism in accordance with a fifth embodiment of the present invention.
Figure 9:
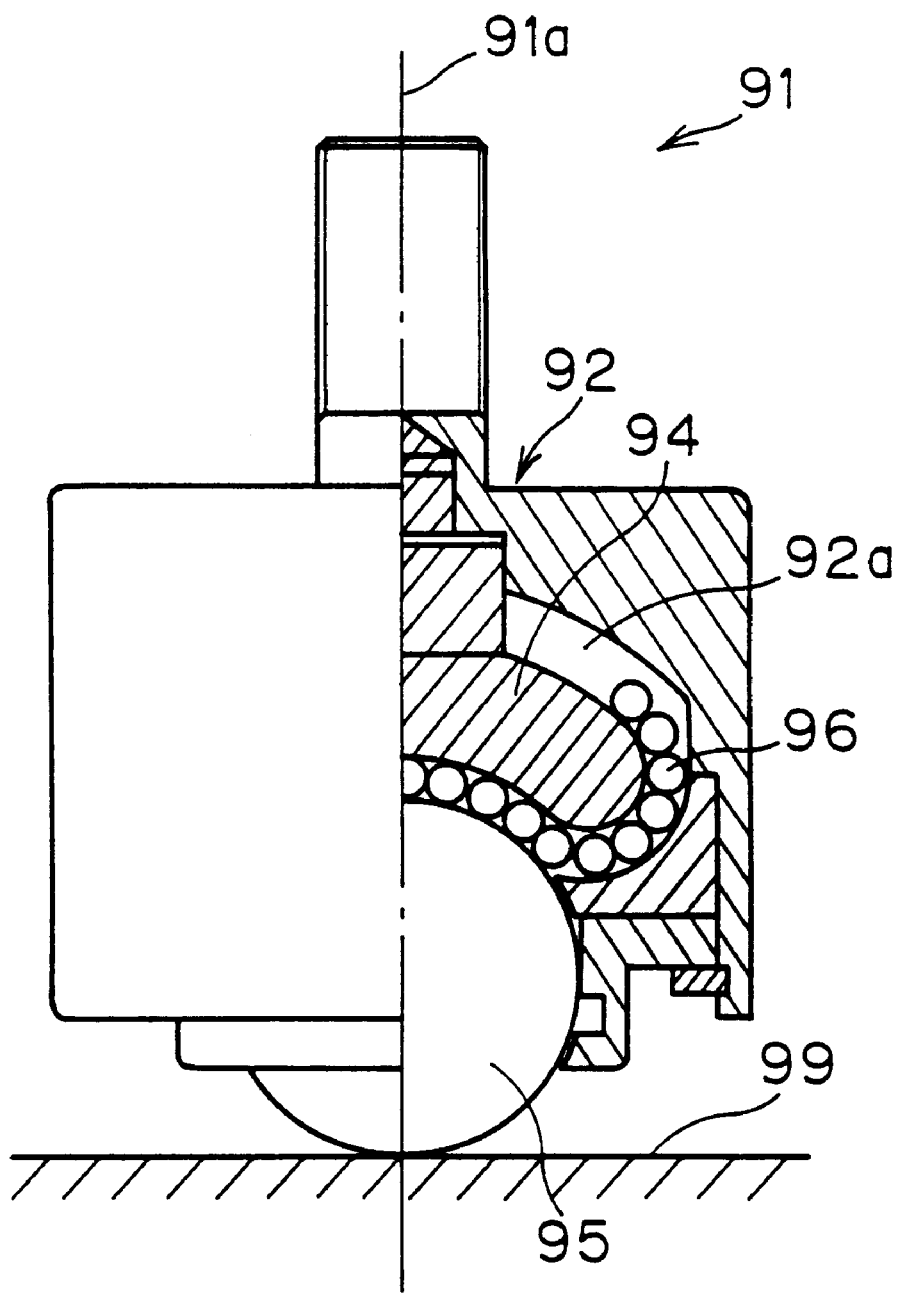
FIG. 9 is a part elevation, part cross section view showing a conventional ball-transfer mechanism.

In accordance with a fifth embodiment of the present invention, a ball-transfer 61 is shown in FIG. 8.

The ball-transfer mechanisms 61 may be one of may ball-transfer mechanisms placed on a plurality of foundations 69 in. for instance, a factory. The plurality of ball-transfer mechanisms 61 may be aligned and can carry a load 70 placed thereon.

Each of the ball-transfer mechanisms 61 includes a main part 62, a large ball 65, a plurality of small balls 66 and a restriction member 80.

The main part 62 includes primarily a case member 63 and a supporting member 64. The case member 63 includes a cover 67 and a retaining member 68. A circular opening part 67a is formed on the upper part of the cover 67. A plurality of bolt holes 67b are formed on a lower portion thereof. By a bolt which passes through the bolt hole 67b, the cover 67 is fixed to the base 69. The retaining member 68 is a disk like part and has a plurality of rod penetrating holes 68a in the outer circumference.

The supporting member 64 is disposed inside the case member 63. A curved, spherically shaped supporting face 64a is formed on the upper part of the supporting member 64. The supporting face 64a has a uniform curved surface that is generally equidistantly spaced apart from the outer circumferential face of the lower part of the large ball 65 by a distance equal to a diameter of the small ball 66, as is described below.

The large ball 65 has a spherical shape and is disposed in the opening part 67a of the cover 67 for contact with the lower surface of the load 70. The lower part of the large ball 65 is supported by the supporting member 64 via the small balls 66.

The small ball 66 is a spherical part which has a smaller diameter than the large ball 65, and is placed between the large ball 65 and the supporting member 64 and in a space 62a (described below) surrounded by the supporting member 64, the large ball 65 and the restriction member 80. However, the space 62a having the small balls 66 is not filled completely with small balls 66 and has some empty space therein. Further, the radial outer edges of the supporting member 64 extend away from the large ball 66 such that small balls 66 disposed in the space 62a no longer contact the large ball 65.

The restriction member 80 includes a rod 81 and a restriction portion 82 integrally formed. The rod 81 is configured to contact a brake operating lever (not shown) which is operated by an operator to move the load 70. The restriction portion 82 is disposed inside the case member 63 and is movable in a vertical direction relative to the case member 63 and the supporting member 64. The rod 81 extends through a rod penetrating hole 68a of the retaining member 68 of the case member 63. The restriction portion 82 extends radially inward, circumferentially confining the space 62a.

The operation of the configuration depicted in FIG. 8 is described below.

When the load 70 on the ball-transfer mechanisms 61 is to move, the restriction member 80 is not operated and remains generally in the position shown in FIG. 8. In other words, with the restriction member 80 located in the position as shown in FIG. 8, the small balls 66 can move freely within the space 62a. In such a condition, since the large ball 65 rolls being supported by the main body 62, the load 70 can move. When the large ball 65 rolls, each small ball 66 which abuts on the lower outer circumference of the large ball 65 rolls on the supporting face 64a of the supporting member 64 and moves from the space between the large ball 65 and the supporting member 64 into the space 62a. As the large ball 65 continues to rotate, the small balls in the space 62a are free to move circumferentially within the space 62a devoid of balls. Gravity thereby feeds the small balls 66 into the empty spaces between the large ball 65 and the supporting face 64a of the supporting member 64. Therefore, the large ball 65 can continue to roll on the main body 62, leading to moving the load 70.

The operation to stop movement of the load 70 is described below.

In the present embodiment, since the ball-transfer 61 has a restriction member 80, the ball-transfer 61 has a brake function. Therefore, it does not need any conventional brake device. When the operator desires for the load 70 to stop movement, the restriction member 80 is moved downward in a vertical direction relative to the main part 62 by operating a brake operating lever (not shown) that is connected to the rod 81. As the result, since the restriction portion 82 contacts the small balls 66 and restricts movement upward of the small balls 66. With the restriction portion 82 in a lowered position, the space 62a is reduced in size, and there is no room for the small balls 66 in which to move freely without contacting the large ball 65. Consequently, the small balls 66 between the supporting member 64 and the large ball 65 are prevented from rotating or moving. Therefore, a friction caused on an abutting face between each small ball 66 and the large ball 65 stops rolling movement of the large ball 65, resulting in stopping the load 70.

Sixth Embodiment

Figure 10:
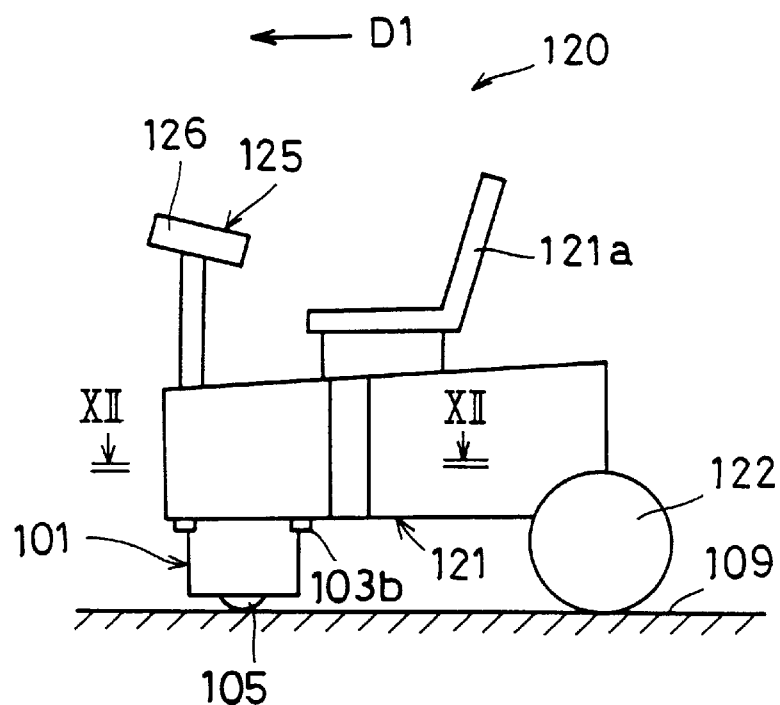
FIG. 10 is a side elevation view of a wheelchair in accordance the present invention.
Figure 11:
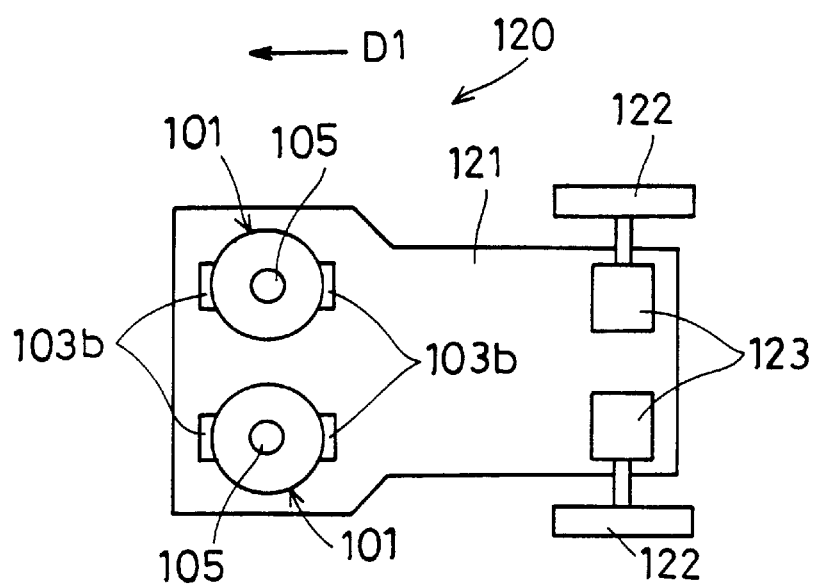
FIG. 11 is a bottom view of the wheelchair depicted in FIG. 10.

A sixth embodiment of the present invention is depicted in FIGS. 10 and 11. In the sixth embodiment of the present invention, an electromotive wheelchair 120 is used, for instance, for a person of an advanced age or a handicapped individual.

The wheelchair 120 includes a main body 121 including a chair 121a, two ball-transfer mechanisms 101, a pair of rear wheels 122, a pair of motors 123, each motor 123 providing power to a corresponding rear wheel 122, and a control unit 125 having an operating control panel 126.

The chair 121a is mounted on an upper portion of the main part 121. On a lower portion of the main body 121, the two ball-transfer mechanisms 101 and the two motors 123 are installed. The two ball-transfer mechanisms 101 are mounted on left and right front sides of the main body 121 and the two motors 123 are mounted to left and right rear sides of the main body 121.

The rear wheel 122 is fixed to an output shaft of the motor 123. The rotational output of each of the motors 123 is reduced by speed reduction gears (not shown) incorporated within each motor 123 such that the rear wheels 122 rotate at safe and desirable speeds.

Figure 13:
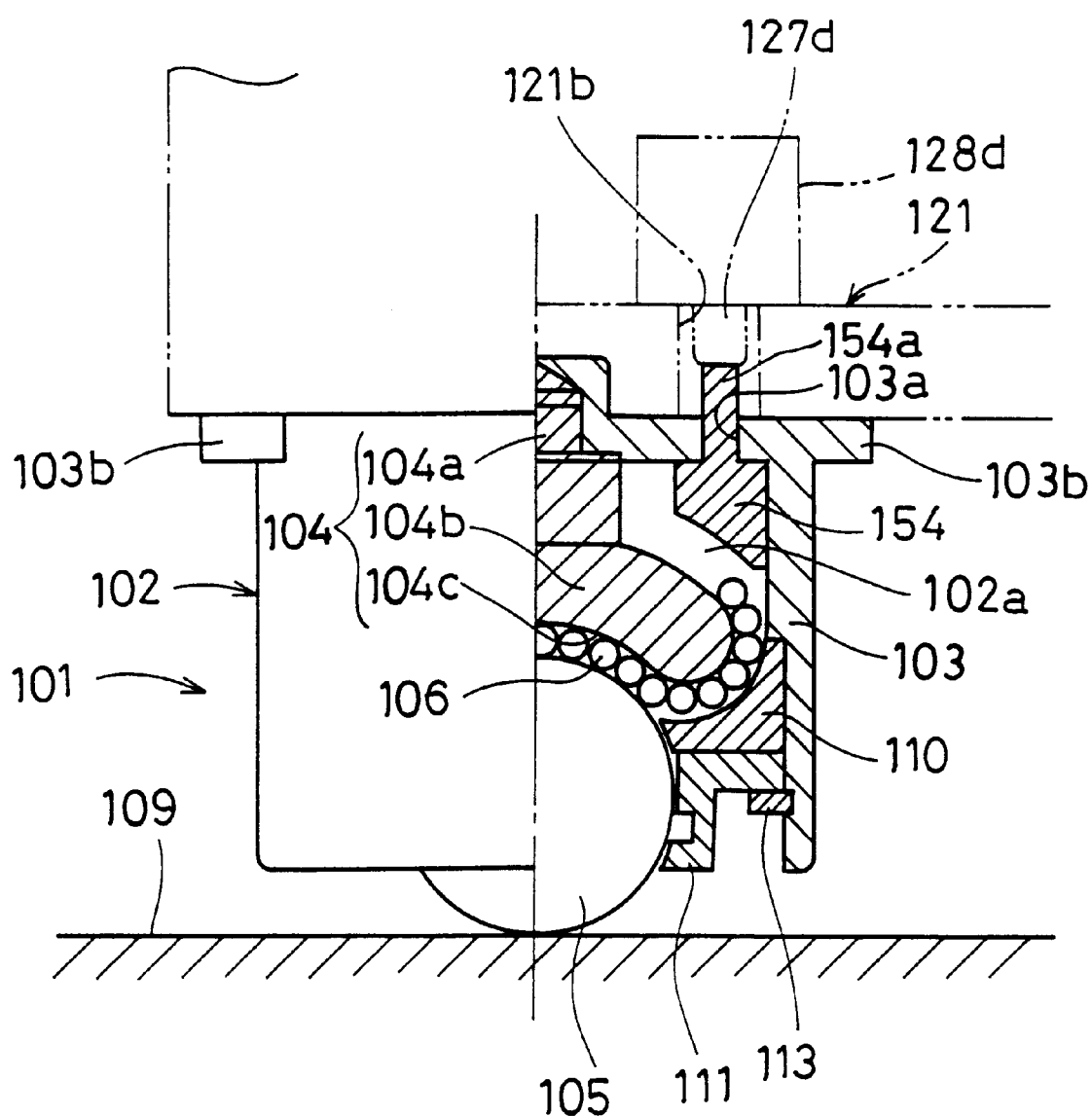
FIG. 13 is a part elevation, part cross section side view showing ball-transfer mechanism similar to that depicted in FIG. 1, installed on an underside of the wheelchair depicted in FIGS. 10 and 11 in accordance with a sixth embodiment of the present invention.

The ball-transfer mechanisms 101 contact the ground 109 as shown in FIGS. 10 and 13, and can move in any direction along the surface of the ground 109. The ball-transfer mechanism 101 includes the ability to limit direction of rotation of a large ball such as a large ball 105 of the ball-transfer mechanism 101 in a manner described above with respect to any of the first, second, third or fourth embodiments of the ball-transfer mechanism of the present invention. However, in the preferred configuration of the sixth embodiment, the ball-transfer mechanism 101 is similar to that described above with respect to the fourth embodiment (FIGS. 6 and 7). Specifically, the rolling direction of the ball-transfer mechanism 101 is limited by movement rods in a vertical direction, such as the rod 154a of the restriction members 154 shown in FIG. 13 and described in greater detail below. The structure of the ball-transfer mechanism 101 is also described in greater detail below.

Figure 12:
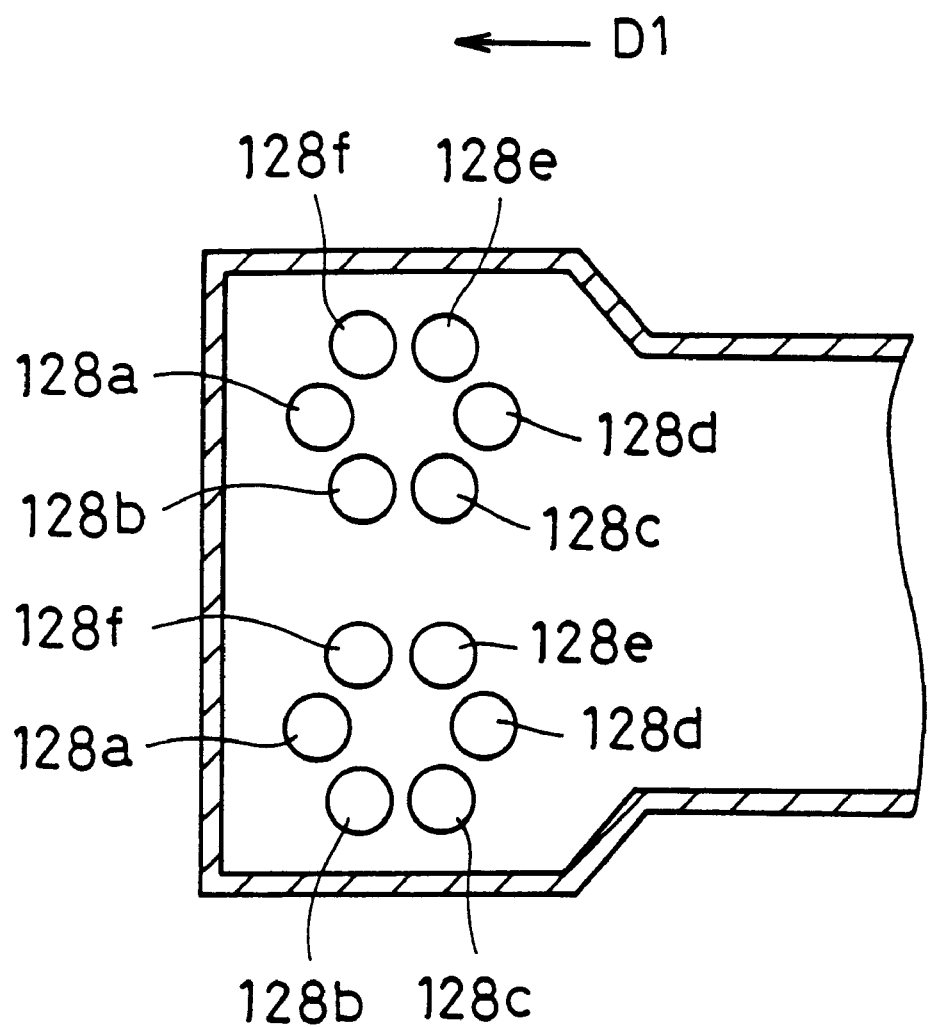
FIG. 12 is a cross section view of the wheelchair depicted in FIGS. 10 and 11, taken along the line XII—XII in FIG. 10, looking in the direction of the arrows.

The control unit 125 includes the operating control panel 126 and is connected to reciprocation controllers 128a, 128b, 128c, 128d, 128e and 128f which are shown in FIG. 12. The reciprocation controllers 128a, 128b, 128c, 128d, 128e and 128f can be any of a variety of devices such as electronic solenoids, hydraulic cylinders or hydraulic cylinders. Each of the reciprocation controllers 128a, 128b, 128c, 128d, 128e and 128f has a rod extending therefrom which is able to go selective reciprocal movement. Since each of the reciprocation controllers 128a, 128b, 128c, 128d, 128e and 128f is generally the same, description of one applies to all. Description is now given of the reciprocation controller 128d, which is shown in FIG. 13. The reciprocation controller 128d includes a rod 127d which, upon actuation of the reciprocation controller 128d, the rod 127d extends downward relative to FIG. 13. When the reciprocation controller 128d is deactivated, the rod 127d is pulled back upward relative to FIG. 13. In FIG. 13, the reciprocation controller 128d is deactivated with the rod 127d in a retracted or upward position.

The operating control panel 126 is placed on a position so as to be able to be operated by a driver sitting on the chair 121a, and is fixed to the main body 121. The operating control panel 126 has a switch (not shown) for controlling the power source of the motor 123 and an adjusting lever (not shown) for forward and reverse movement control and an operating panel (not shown) for controlling sequences activation and deactivation of the reciprocation controllers 128a, 128b, 128c, 128d, 128e and 128f and corresponding movement of the rods such as the rod 127d described above. The reciprocation controllers 128a, 128b, 128c, 128d, 128e and 128f are each mounted on an upper surface of the main body 121 such that corresponding rods, such as the rod 127d, extend through corresponding holes 121b formed in the main body 121, as shown in FIG. 13. The rods, such as the rod 127d, are then able, upon actuation, to extend downward, as is described greater detail below. The reciprocation controllers 128a, 128b, 128c, 128d, 128e and 128f selectively move the rod, such as the rod 127d downward or upward in response to signals from the operating control panel 126. In the sixth embodiment, electromotive bore cylinders are used as the reciprocation controllers 128a, 128b, 128c, 128d, 128e and 128f.

The structure of the ball-transfer mechanism 101 is described in greater detail below.

Figure 14:
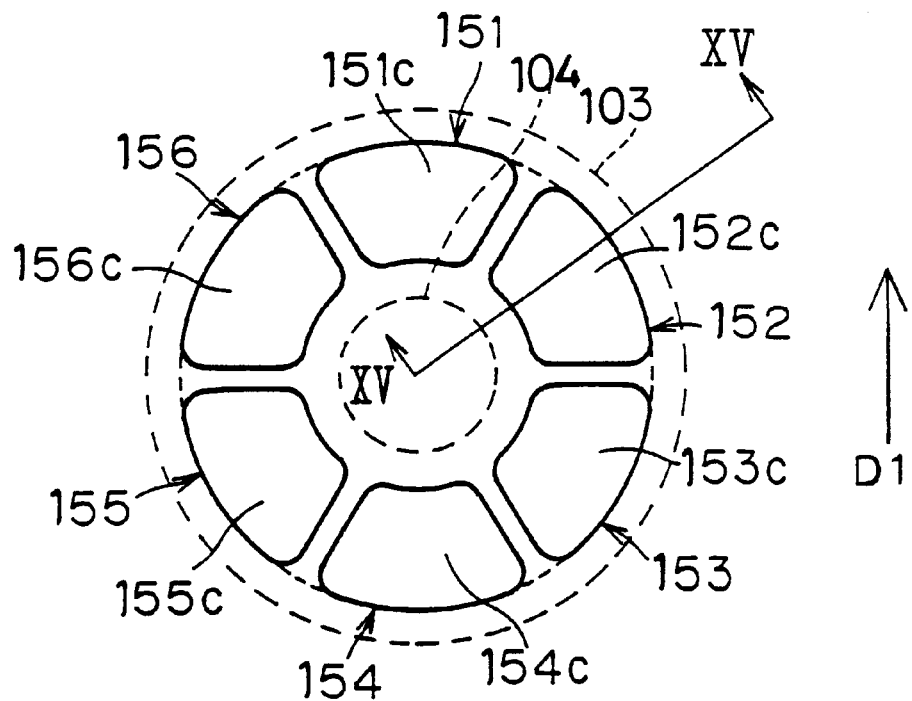
FIG. 14 is a bottom elevation view similar to FIG. 6, showing a restriction member of the ball transfer mechanism depicted in FIG. 13.
Figure 15:
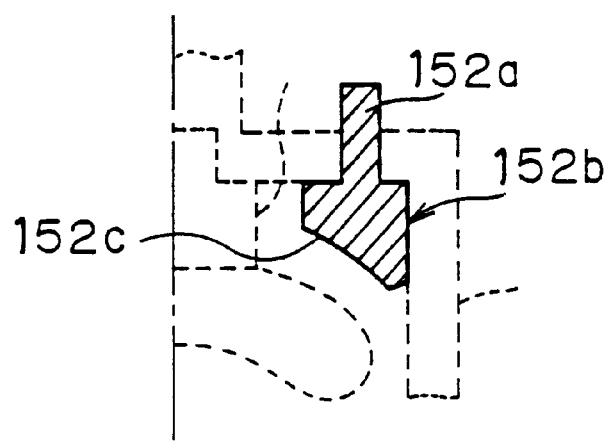
FIG. 15 is a side, cross section view similar to FIG. 7, showing features of the restriction member and ball transfer mechanism depicted in FIGS. 13 and 14, taken along the line XV—XV in FIG. 14.
Figure 16:
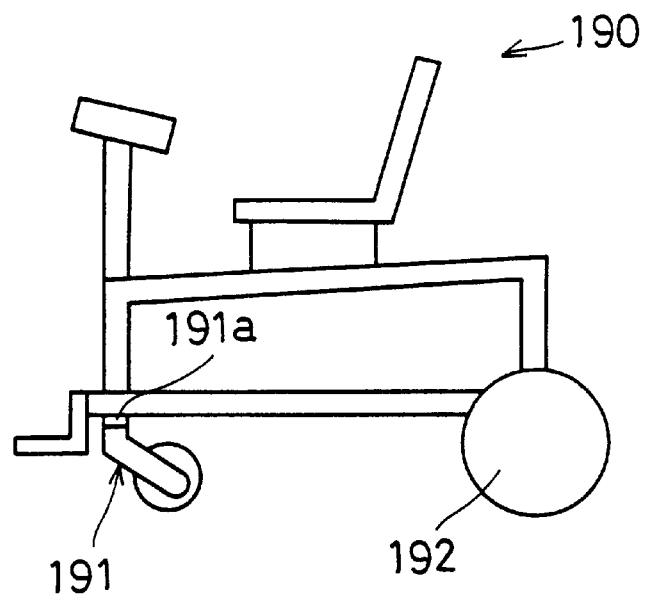
FIG. 16 is a side elevation view showing a conventional wheelchair with casters mounted on a front end thereof.
Figure 17:
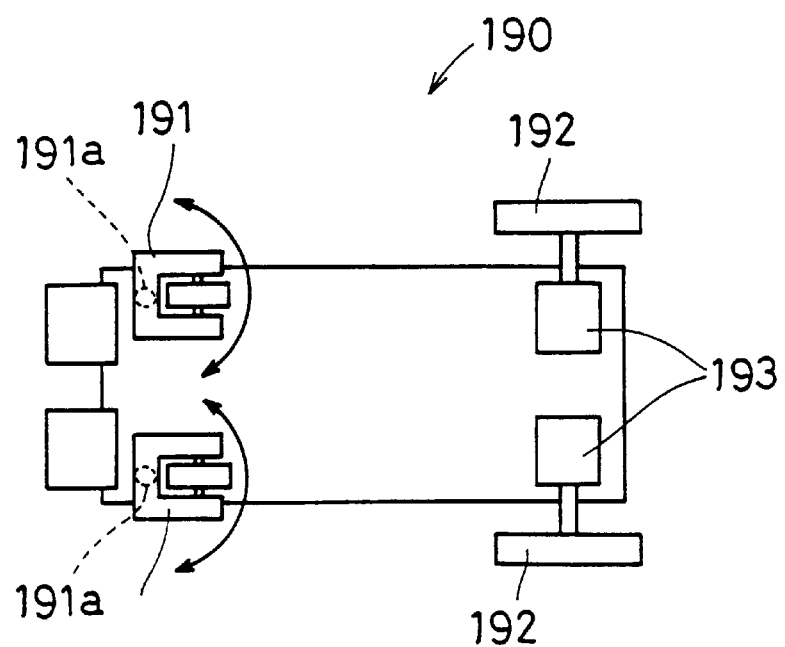
FIG. 17 is a bottom view of the conventional wheelchair depicted in FIG. 16.

The ball-transfer mechanism 101 includes mainly a ball-transfer main body 102, a large ball 105, a plurality of small balls 106 and the restriction members 151 to 156 as shown in FIGS. 13, 14 and 15.

The ball-transfer main body 102 includes a case member 103, a supporting member 104, a small ball retaining member 110 and a large ball retaining member 111. The case member 103 is a cylindrical member having a lower portion open, and a plurality of rod penetrating openings 103a. An installation rib 103b is formed on the upper outer circumference of the case member 103, and the installation rib 103b is fixed to the main body 121 by, for instance, a plurality of bolts (not shown).

The supporting member 104 is disposed on an inner side of the case member 103, and is fixed to the case member 103 by a fixing part 104a formed at an upper portion of the supporting member 104. An abutting part 104b with a curved supporting face 104c is formed at the lower part of the supporting member 104. The distance between the outer circumferential end of the abutting part 104b and the inner circumferential face of the case member 103 is at least as large as the diameter of small balls 106 and is preferably a little larger than the diameter of the small balls 106. The supporting face 104c is spaced apart from the adjacent surface of the large ball 105 only by the diameter of the small balls 106.

The large ball 105 is installed in the opening part of the lower part of the case member 103. The upper part of the large ball 105 is supported by the supporting member 104 via the small balls 106, and the large ball 105 also contacts the ground 109.

The small balls 106 has a smaller diameter than the large ball 105, and are disposed between the large ball 105 and the supporting member 104, between the small ball retaining member 110 and the supporting member 104, and in a space 102a surrounded by the supporting member 104, the case member 103 and the restriction members 151 to 156. The space 102a retains some of the small balls 106 but during operation is typically partially empty.

The lower faces of the restriction members 151 to 156 are shown in FIG. 14. The restriction members 151, 152, 153, 154, 155 and 156 are each formed with a rod such as the rod 152a of the restriction member 152 shown in FIG. 15. Since the restriction members 151, 152, 153, 154, 155 and 156 are generally the same, description of one restriction member 152 applies generally to all of the restriction members 151, 152, 153, 154, 155 and 156. The restriction member 152 is further formed with a regulating element 152b (see FIG. 15). The regulating element 152b is disposed inside the case member 103, and is movable in a vertical direction relative to the case member 103 and the supporting member 104. A regulating face 152c is formed at a lower surface of the regulating element 152b. T regulating face 152c is configured to abut the small ball 106 in response to movements of the rod 127d downward, as is explained in greater detail below.

The regulating faces of the restriction members 151, 152, 153, 154, 155 and 156, such as the regulating face 152c is curved corresponding to the curved upper face of the abutting part 104b of the supporting member 104. Rods, such as the rod 152a, extend upward from the upper face of the regulating element 152b, and extend through the rod penetrating hole 103a. The upper portions of rod 152a abut on the lower face of rod 127d within the hole 121b of the main body 121. It should be understood that the restriction members 151, 152, 153, 154, 155 and 156 are all configured in a manner similar to the restriction member 152 described above.

The operation of the wheelchair 120 and the ball-transfer mechanism 101 is described as follows.

When each of rod, such as the rod 127d is in a retracted or upward position, as shown in FIGS. 13 and 15, the position of each of restriction members 151, 152, 153, 154, 155 and 156 is likewise in an upper position, such as that of the restriction member 154 as shown in FIG. 13. In other words, the small ball 106 can move freely within the housing space 102a. In this condition, since the large ball 105 rolls being supported by the ball-transfer main body 102, the ball-transfer mechanism 101 can move freely on the ground 109 in virtually any direction. When the large ball 105 rolls, each small ball 106 which abuts on the upper outer circumferential part of the large ball 105 rolls on the supporting face 104c of the supporting member 104. And then, some small balls 106 move from the space between the large ball 105 and the supporting member 104 toward the space between the small ball retaining member 110 and the supporting member 104. Some of the small balls 106 may then move into the space 102a. On the other hand, gravity pulls the small balls 106 in other portions of the space 102a downward into the space between the large ball 105 and the supporting member 104. Thus, the large ball 105 can continue to roll in any direction within the main body 102, the ball-transfer mechanism 101 can continue to move relative to the ground 109. Therefore, when each of the rods, such as the rod 127d is in a retracted position (FIG. 13), the wheelchair 120 can go straight or can circle under the power of the motor 123.

When an operator desires to restrict the wheelchair from moving in a particular directions, for instance, in advancing direction D1 (FIGS. 10, 12 and 14), the operator can manipulate the control panel on the operating control panel 126 activating appropriate reciprocation controllers. For example, reciprocation controllers 128b, 128c, 128e and 128f may be operated by the operating control panel 126. As the result, the corresponding rods of the reciprocation controllers 128b, 128c, 128e and 128f extend downward in a manner similar to that described above with respect to the rod 127d (FIG. 13) causing the regulating faces 152c, 153c, 155c and 156c of the restriction members 152, 153, 155 and 156 contact the adjacent small balls 106. The adjacent small balls 106 are then held in place between the upper face of the abutting part 104b and each of the regulating faces 152c, 153c, 155c and 156c. Consequently, those small balls 106 are prohibited from moving within the housing space 102a, and small balls 106 between the supporting member 104 and the small ball retaining member 110 and between the supporting member 104 and the large ball 105 are also restricted from moving. However, while small balls 106 are held between the upper face of the abutting part 104b and each of the regulating faces 152c, 153c, 155c and 156c, the remaining small balls 106 (those adjacent to regulating faces 151c and 154c) can move freely within the space formed between the upper face of the abutting face 104b and the regulating faces 151c and 154c. In other words, small balls 106 between the supporting member 104 and the small ball supporting member 110 and between the supporting member 104 and the large ball 105 can move in a direction which extends between the restriction members 151 and 154. Therefore, the large ball 105 of the ball-transfer mechanism 101 can roll only in a direction D1 and the wheelchair can go straight in the direction D1.

In should be understood that movement of the restriction members 151 is controlled by the reciprocation controllers 128a, restriction members 152 is controlled by the reciprocation controllers 128b, restriction members 153 is controlled by the reciprocation controllers 128c, restriction members 154 is controlled by the reciprocation controllers 128d (FIG. 13), restriction members 155 is controlled by the reciprocation controllers 128e, and restriction members 156 is controlled by the reciprocation controllers 128f.

In another example, when the wheelchair 120 is desired to turn or circle, the reciprocation controllers 128a, 128b, 128d and 128e are activated for a clockwise circling and the reciprocation controllers 128a, 128c, 128d and 128f are activated for a counterclockwise circling. As a result, the wheelchair 120 can run only in a direction which extends between the restriction members 153 and 156 for a clockwise circling or in a direction which extends between the restriction members 152 and 155 for a counterclockwise circling motion.

When the wheelchair 120 is to stop, all of the reciprocation controllers 128a, 128b, 128c, 128d, 128e and 128f are activated and the motor 123 is stopped. As the result, all of the small balls 106 are prevented from moving, the large ball 105 can not roll in any direction, and friction resistance between the ground 109 and the large ball 105 provides braking engagement. Consequently, stopping response time can be reduced.

In the present embodiment, although the movement of the restriction members 151, 152, 153, 154 155 and 156 is operated by controlling the reciprocation controllers 128a, 128b, 128c, 128d, 128e and 128f, using the control panel, it may alternatively be possible to operate manually.

Although six restriction members 151, 152, 153, 154, 155 and 156 are used for the present embodiment, it is possible to increase or decrease the number, if necessary.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What we claim is:

1. A ball-transfer mechanism comprising:

a main body, a spherical large ball at least partially retained in said main body, said large ball configured for rolling engagement with a generally flat surface, a plurality of spherical small balls disposed within a portion of said main body, at least a first portion of said small balls being disposed within said main body for rolling contact with an outer circumferential surface of said large ball, said small balls having a diameter smaller than said large ball, and at least one restriction member, a portion of said restriction member being disposed within said main body for selective engagement with a second portion of said small balls spaced apart from said first portion of said small balls, movement of said second portion of said small balls being restricted upon engagement with said portion of said restriction member.

2. The ball-transfer mechanism as set forth in claim 1, further comprising:

said main body being formed with a cylindrically shaped case member having a closed first end, an opposing open end and a cylindrical wall extending therebetween, a supporting member disposed within said main body, said supporting member having first and second surfaces, said first surface having a generally convex shape, said second surface having a generally concave shape, said supporting member further having a circumferential outer surface extending between said first and second surfaces, said first surface of said supporting member formed with an extending member which is fixed to an inner surface of said first end of said main body, said inner surface of said first end of said case member and said convex surface of said supporting member defining a space therebetween, said outer circumferential surface of said supporting member an inner surface of said cylindrical wall defining a second space and said concave surface and said large ball defining a third space, and wherein said first portion of said small balls are disposed in said third space and said second portion of said small balls are disposed in said first space.

3. The ball-transfer mechanism as set forth in claim 2, wherein said first portion of said restriction member is disposed in said first space and a rod fixed to and extending from said first portion of said restriction member extends through an aperture formed in said first end of said main body, said rod of said restriction member configured for movement in and out of said first space.

4. The ball-transfer mechanism as set forth in claim 1, wherein said restriction member has a generally annular dish-like shape with a concave engagement surface, said engagement surface being formed with a plurality of projections, said engagement surface and said projections being configured to face said small balls for selective engagement therewith.

5. The ball-transfer mechanism as set forth in claim 1, wherein said restriction member has a generally annular dish-like shape with a concave engagement surface, said engagement surface being formed with a groove extending from one circumferential side to an opposing circumferential side, and in response to movement toward said small balls, said engagement surface of said restriction member engages said small balls restricting movement of said balls and said small balls proximate said groove are not restricted from movement.

6. The ball-transfer mechanism as set forth in claim 1, wherein a plurality of said restriction members are disposed in said main body, each of said restriction members being formed with a concave surface formed on a first portion thereof and a rod fixed to and extending from said first portion, said rod extending through a corresponding aperture formed in said main body, each of said rods of said plurality of said restriction members configured for movement in and out of said main body such that movement of one of said rods moves a corresponding one of said concave surfaces into engagement with adjacent ones of said small balls for restricting movement of said ones of said small balls.

7. A rolling vehicle comprising:
a frame,
at least one ball-transfer mechanism fixed to an underside of said frame, said ball-transfer mechanism comprising:
a main body,
a spherical large ball at least partially retained in said main body, said large ball configured for rolling engagement with a generally flat surface,
a plurality of spherical small balls disposed within a portion of said main body, at least a first portion of said small balls being disposed within said main body for rolling contact with an outer circumferential surface of said large ball, said small balls having a diameter smaller than said large ball; and
at least one restriction member, a portion of said restriction member being disposed within said main body for selective engagement with a second portion of said small balls spaced apart from said first portion of said small balls, movement of said second portion of said small balls being restricted upon engagement with said portion of said restriction member.

8. The vehicle as set forth in claim 7, wherein the restriction member of said ball-transfer mechanism is configured to selectively restrict movement of the vehicle in a generally forward.

9. The vehicle as set forth in claim 7, wherein the restriction member of said ball-transfer permits a movement of said small balls so that said car can move in any direction.

10. The vehicle as set forth in claim 7, wherein said ball-transfer is mounted to a front end of said frame.

11. The vehicle as set forth in claim 7, wherein said frame supports an electromotive wheelchair, said electromotive wheelchair having means for controlling movement of said restriction member.

12. The vehicle as set forth in claim 7, wherein said frame is an industrial flat cart having means for controlling movement of said restriction member.

13. The vehicle as set forth in claim 7, further comprising:
said main body being formed with a cylindrically shaped case member having a closed first end, an opposing open end and a cylindrical wall extending therebetween,
a supporting member disposed within said main body, said supporting member having first and second surfaces, said first surface having a generally convex shape, said second surface having a generally concave shape, said supporting member further having a circumferential outer surface extending between said first and second surfaces, said first surface of said supporting member formed with an extending member which is fixed to an inner surface of said first end of said main body, said inner surface of said first end of said case member and said convex surface of said supporting member defining a space therebetween, said outer circumferential surface of said supporting member an inner surface of said cylindrical wall defining a second space and said concave surface and said large ball defining a third space, and wherein
said first portion of said small balls are disposed in said third space and said second portion of said small balls are disposed in said first space.

14. The vehicle as set forth in claim 13, wherein said first portion of said restriction member is disposed in said first space and a rod fixed to and extending from said first portion of said restriction member extends through an aperture formed in said first end of said main body, said rod of said restriction member configured for movement in and out of said first space.

15. The vehicle as set forth in claim 7, wherein said restriction member has a generally annular dish-like shape with a concave engagement surface, said engagement surface being formed with a plurality of projections, said engagement surface and said projections being configured to face said small balls for selective engagement therewith.

16. The vehicle as set forth in claim 7, wherein said restriction member has a generally annular dish-like shape with a concave engagement surface, said engagement surface being formed with a groove extending from one circumferential side to an opposing circumferential side, and in response to movement toward said small balls, said engagement surface of said restriction member engages said small balls restricting movement of said balls and said small balls proximate said groove are not restricted from movement.

17. The vehicle as set forth in claim 7, wherein a plurality of said restriction members are disposed in said main body, each of said restriction members being formed with a concave surface formed on a first portion thereof and a rod fixed to and extending from said first portion, said rod extending through a corresponding aperture formed in said main body, each of said rods of said plurality of said restriction members configured for movement in and out of said main body such that movement of one of said rods moves a corresponding one of said concave surfaces into engagement with adjacent ones of said small balls for restricting movement of said ones of said small balls.

* * * * *